United States Patent
Prieto et al.

(10) Patent No.: US 9,999,886 B2
(45) Date of Patent: Jun. 19, 2018

(54) METHODS AND SYSTEMS FOR ON DEMAND DROPLET GENERATION AND IMPEDANCE BASED DETECTION

(75) Inventors: Javier L. Prieto, Cambridge, MA (US); Robert Lin, Irvine, CA (US); Abraham Phillip Lee, Irvine, CA (US); Jeffrey S. Fisher, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 509 days.

(21) Appl. No.: 13/269,428

(22) Filed: Oct. 7, 2011

(65) Prior Publication Data

US 2013/0028812 A1    Jan. 31, 2013

Related U.S. Application Data

(60) Provisional application No. 61/390,948, filed on Oct. 7, 2010.

(51) Int. Cl.
*B01J 13/06* (2006.01)
*B01L 99/00* (2010.01)
*G01N 15/12* (2006.01)
*G01N 33/48* (2006.01)
*B01L 3/00* (2006.01)
(Continued)

(52) U.S. Cl.
CPC ...... *B01L 3/502784* (2013.01); *B01F 3/0807* (2013.01); *B01F 13/0062* (2013.01); *B01F 13/0076* (2013.01); *B01J 13/04* (2013.01); *B01L 2200/0647* (2013.01); *B01L 2200/143* (2013.01);
(Continued)

(58) Field of Classification Search
CPC ........ A61K 39/395; C12Q 1/02; G01N 33/53; A01N 1/02
See application file for complete search history.

(56) References Cited

U.S. PATENT DOCUMENTS

| 2,656,508 | A | * | 10/1953 | Coulter | ................. | G01N 15/12 |
| | | | | | | 324/439 |
| 3,380,584 | A | * | 4/1968 | Fulwyler | ................. | B01F 13/00 |
| | | | | | | 209/127.1 |

(Continued)

OTHER PUBLICATIONS

Lin, R., et al. "High efficiency cell encapsulation utilizing novel on-demand droplet generation scheme and impedance-based detection." 14th international conference on miniaturized systems for chemistry and life sciences, ed. H. Andersson-Svahn, S. Verpoorte, J. Emineus, N. Pamme. 2010.*

*Primary Examiner* — Robert Eom
(74) *Attorney, Agent, or Firm* — Nguyen & Tarbet Law Firm

(57) ABSTRACT

The present invention pertains to methods and systems for on demand droplet generation and impedance based detection. The microfluidic system can utilize an electrical sensor for detecting an electrical property of a fluid and for generating an electrical signal indicating a change in the electrical property of the fluid; a droplet generator coupled to the electrical sensor configured to generate the droplet from the fluid in response to the electrical signal from the electrical sensor; and a microfluidic channel coupled to the droplet generator for receiving the droplet. The method for generating droplets involves measuring an electrical property of the fluid, transmitting an electrical signal indicative of the electrical property, and forming the droplets from the fluid based on the electrical signal.

10 Claims, 19 Drawing Sheets

(51) Int. Cl.
  *B01J 13/04* (2006.01)
  *B01F 13/00* (2006.01)
  *B01F 3/08* (2006.01)

(52) U.S. Cl.
  CPC . *B01L 2300/0645* (2013.01); *B01L 2300/123* (2013.01); *B01L 2400/0487* (2013.01)

(56) References Cited

U.S. PATENT DOCUMENTS

| | | | | |
|---|---|---|---|---|
| 4,009,435 | A | * | 2/1977 | Hogg .......................... 324/71.1 |
| 5,465,582 | A | * | 11/1995 | Bliss et al. ..................... 62/51.1 |
| 2008/0241875 | A1 | * | 10/2008 | Hwang et al. ................. 435/39 |
| 2009/0068170 | A1 | * | 3/2009 | Weitz et al. ............... 424/130.1 |

* cited by examiner

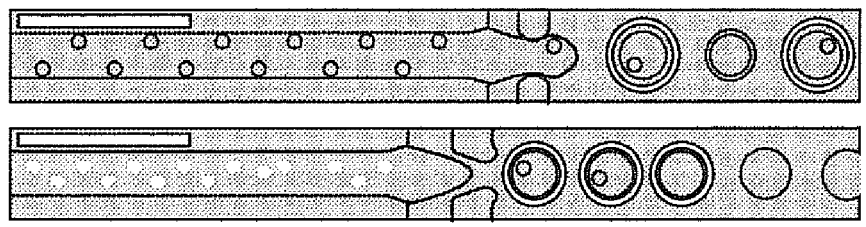
Figure 21
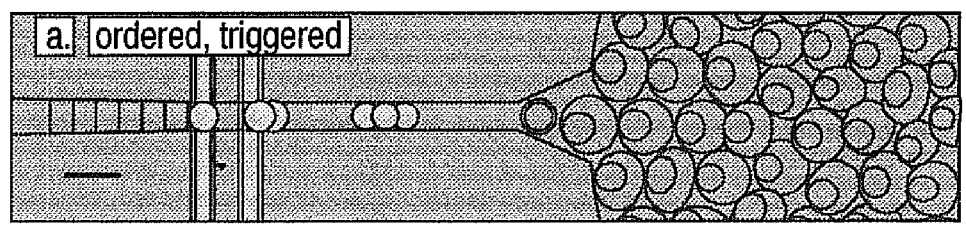
Figure 22
| Droplet Radius (μm) | % Droplets with cells |
|---|---|
| 10 | 0.42 |
| 25 | 6.54 |
| 50 | 52.36 |
Figure 23

METHODS AND SYSTEMS FOR ON DEMAND DROPLET GENERATION AND IMPEDANCE BASED DETECTION

RELATED U.S. APPLICATION

This application claims priority to the U.S. provisional patent application Ser. No. 61/390,948, entitled "METHODS AND SYSTEMS FOR ON DEMAND DROPLET GENERATION AND IMPEDANCE BASED DETECTION," with filing date Oct. 7, 2010, which is hereby incorporated by reference in its entirety.

BACKGROUND

Cell encapsulation has developed into an integral part of droplet microfluidic research, with various groups demonstrating technologies to improve the encapsulation process. However, many challenges still need to be overcome for microfluidic technology to become a truly viable platform for the biomedical field.

FIGS. 1, 2, 3, and 4 are diagrams showing a variety of cell encapsulation processes that have been developed on microfluidic systems. FIG. 5 is a diagram showing a process for controlled encapsulation of single-cells into monodisperse picoliter drops. FIG. 6 is a diagram showing a process for overcoming Poisson encapsulation challenges. Drawbacks of conventional systems include the concentration dependency of encapsulation efficiency, temporariness of overcoming Poisson challenges and an assumption of a concentration of $1 \times 10^6$ cells per ml.

In conventional continuous and on-demand droplet generation schemes the entire volume of the dispersed phase is made into droplets in a sequential manner. This results in high percentages of empty droplets as compared to cell-encapsulating droplets over a large volume.

SUMMARY

In one embodiment, a microfluidic system for generating a droplet is provided. The microfluidic system can utilize an electrical sensor for detecting an electrical property of a fluid and for generating an electrical signal indicating a change in the electrical property of the fluid; a droplet generator coupled to the electrical sensor configured to generate the droplet from the fluid in response to the electrical signal from the electrical sensor; and a microfluidic channel coupled to the droplet generator for receiving the droplet. The electrical sensor can be an impedance sensor and can utilize a plurality of electrodes for determining size of an object in the fluid. The electrical sensor can also utilize three electrodes for determining size and speed of an object in the fluid. The droplet generator can utilize a deformable chamber. The droplet generator can also utilize an activation delay circuit coupled to the electrical sensor. The delay can be less than 30 ms. The droplet generator can utilize an actuation timing circuit for controlling size of the droplet and can be variable. The actuation time can be less than 500 ms.

In another embodiment, a method for generating droplets from a fluid is provided. An electrical property of the fluid is measured; an electrical signal indicative of the electrical property is transmitted; and the droplets from the fluid is formed based on the electrical signal. The electrical property can be impedance. The size of an object in the fluid can be determined. The speed of an object in the fluid can be calculated. The electrical signal indicative of the electrical property can be delayed. The delay can be between 10 ms and 30 ms. The electrical property can be sampled at a sampling rate of at least 48 kHz. A chamber containing the fluid can be actuated. The actuation time can be between 10 ms and 500 ms. The chamber containing the fluid can be deformed at a rate of at least 10 Hz.

These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 21, 22 and 23 are diagrams showing problems of conventional systems that can be addressed by embodiments of the present invention.

The drawings referred to in this description should not be understood as being drawn to scale except if specifically noted.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

In one embodiment, a microfluidic system capable of encapsulating cells at very high efficiency is provided. The device is intended to address the problem of empty droplets generated using conventional encapsulation methods. The device integrates impedance measurement with an on-demand droplet generation process to enable the selective generation of droplets when the presence of a cell is detected. This ensures that a high percentage of droplets that are generated actually contain cells, regardless of initial cell concentration. In one embodiment, the system includes but is not limited to the utilization of droplets, cell encapsulation, and on-demand impedance detection. In one embodiment, a specifically selected volume within the dispersed fluid stream is converted into droplets, enabling the selective encapsulation of cells.

Figure 2:
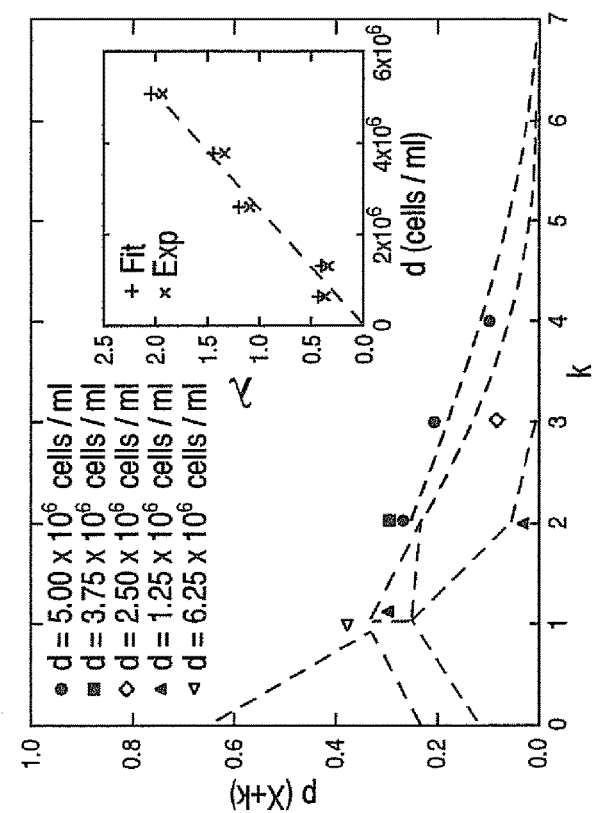
FIGS. 1, 2, 3, and 4 are diagrams showing a variety of cell encapsulation processes that have been developed on microfluidic systems.
Figure 1:
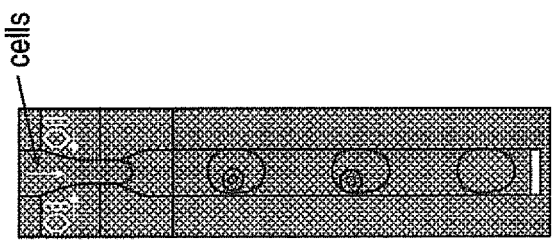
Figure 3:
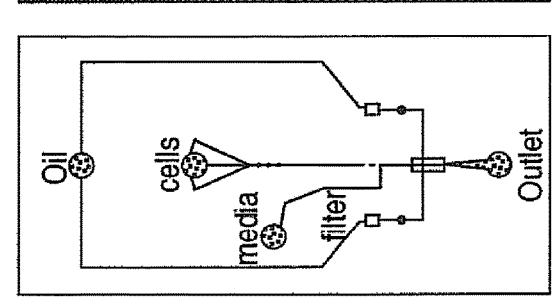
Figure 4:
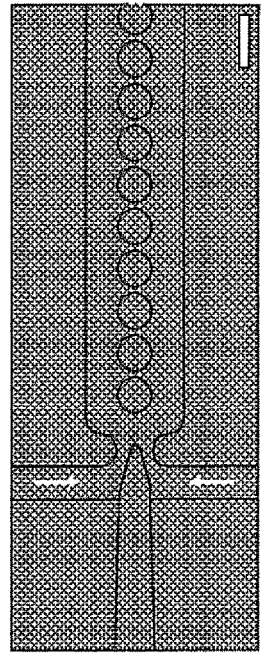
Figure 5:
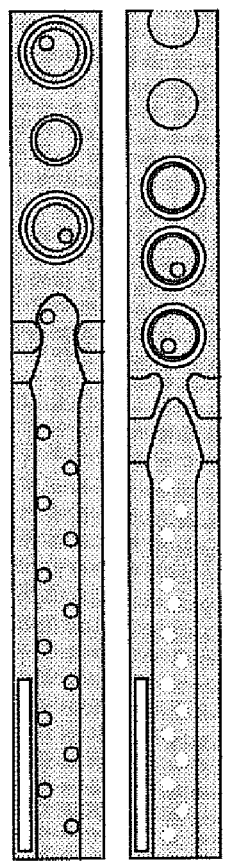
FIG. 5 is a diagram showing a process for controlled encapsulation of single-cells into monodisperse picoliter drops.
Figure 6:
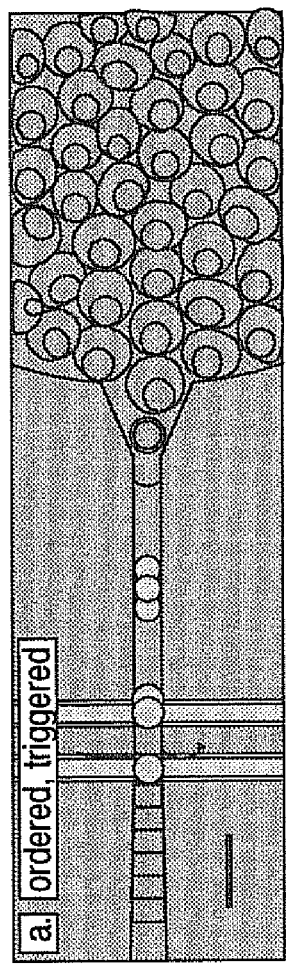
FIG. 6 is a diagram showing a process for overcoming Poisson encapsulation challenges.
Figure 7:
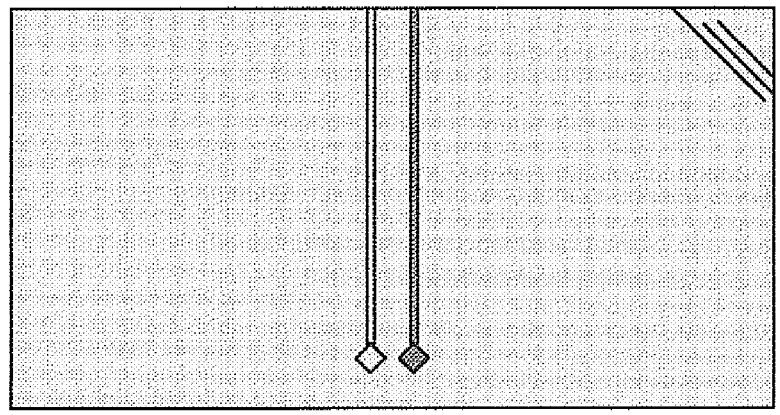
FIG. 7 is a diagram showing droplet generation region of a droplet generation device of one embodiment of the present invention.
Figure 8:
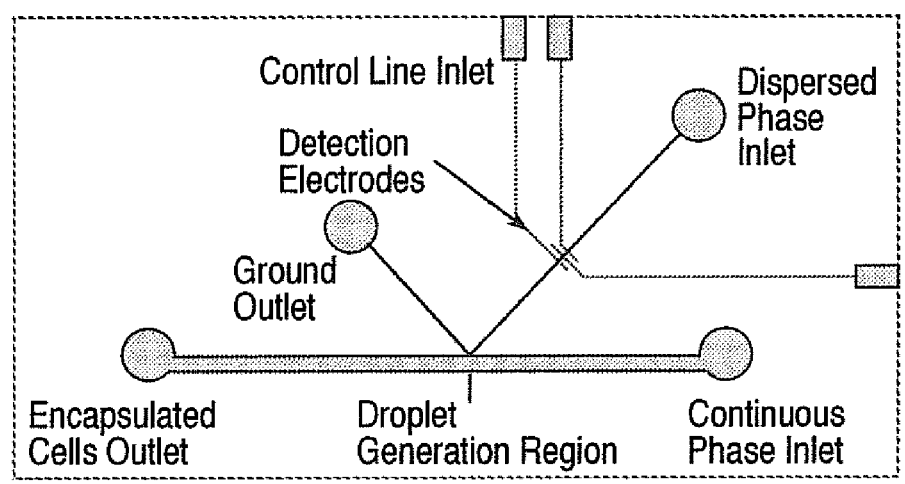
FIG. 8 is a diagram showing a labeled schematic of a device of one embodiment of the present invention.

FIG. 7 is a diagram showing droplet generation region of a droplet generation device of one embodiment of the present invention. FIG. 8 is a diagram showing a labeled schematic of a device of one embodiment of the present invention. Contacts for the electrodes are shown at the edge of the device. The rectangle near the droplet generation region is a deformable chamber that is used to generate cell-encapsulating droplets. In one embodiment the device consists of two main components: (1) an impedance sensor; and (2) an on-demand droplet generator. In one embodiment, the impedance sensor is comprised of three electrodes patterned on glass and positioned below a cell inlet channel as shown in FIG. 7. In one embodiment, the device is made of poly dimethylsiloxane (PDMS) on a glass substrate. The cell suspension fluid provides a baseline impedance measurement as it flows past the electrodes. Due primarily to the presence of the cell membrane, a cell may present a different impedance measurement when compared to the surrounding fluid. In one embodiment, this difference (e.g., change in impedance) is detected by the sensing electrodes and used to indicate the presence of cells inside the channel. In one embodiment, the on-demand generation component may consist of a modified T junction connected to an added ground line.

Figure 9:
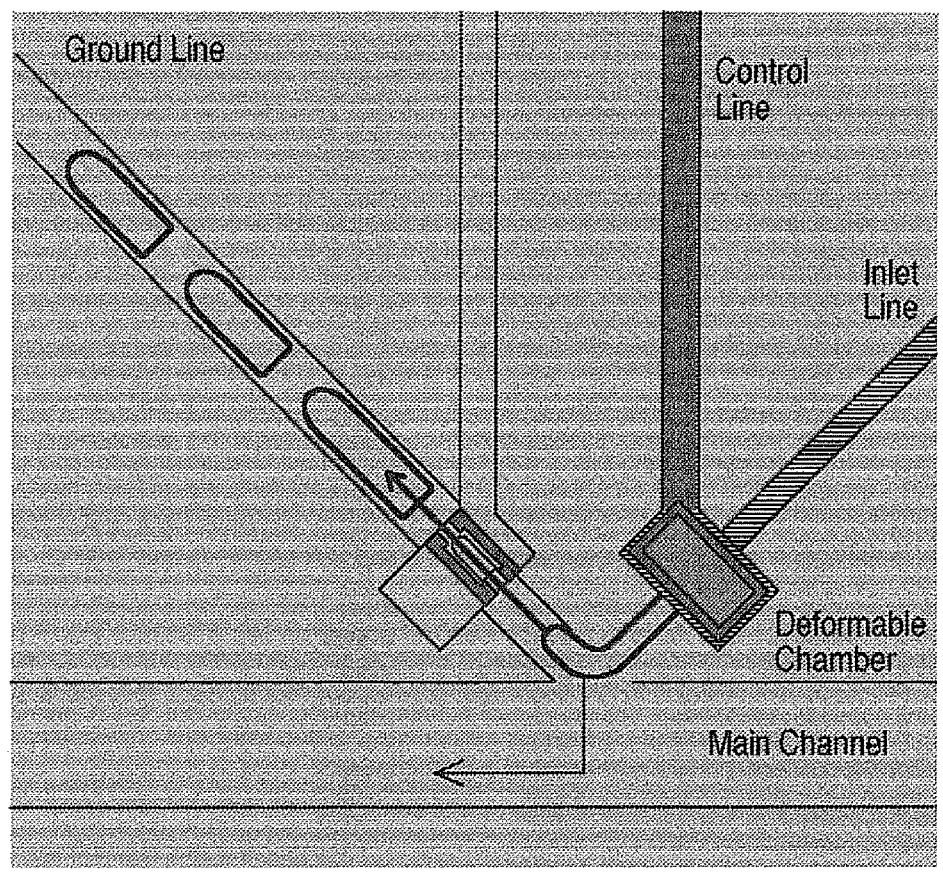
FIG. 9 is a diagram showing components of a device of one embodiment of the present invention.

In one embodiment, the droplet generation system (e.g., device shown in FIG. 8) functions by directing all dispersed phase fluid into a ground line as the default state and dispensing or directing fluid into the main channel only when activated. FIG. 9 is a diagram showing components of a device of one embodiment of the present invention. More specifically, FIG. 9 shows an encapsulation region of the device, where a top arrow shows a default path of dispersed phase towards the ground line and a bottom arrow shows the path of dispersed phase when the chamber is activated to create a droplet in the main fluidic channel. Referring to FIG. 9, in one embodiment, the control line is used to deform the chamber near the droplet generation region (see inlet line). As a result of this deformation, an influx of fluid is forced out of the chamber and into a droplet shearing junction, forming a single droplet (that is directed into the main channel).

Figure 10:
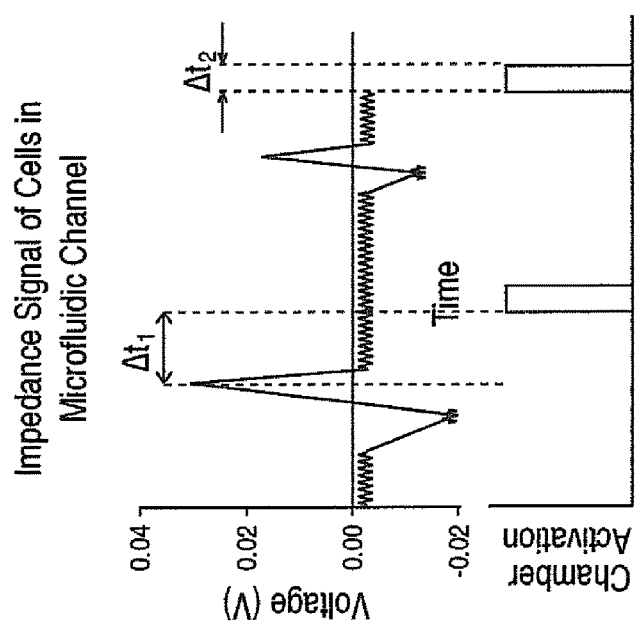
FIG. 10 is a graph illustrating the alignment of impedance signal of cells with the chamber activation to create droplets encapsulating the corresponding cells.

In one embodiment, when the pressure is released, the flow returns to the previous pattern where the dispersed phase fluid flows into the ground line. By coupling the impedance detection of cells with droplet generation, droplets are produced that may always contain cells. More specifically, in one embodiment, empty droplets are not produced. A number of parameters govern the behavior of the devices, and critical of which is the timing of the initiation of the droplet generation process and the length of the chamber actuation time as shown in FIG. 10. FIG. 10 is a graph illustrating the alignment of impedance signal of cells with the chamber activation to create droplets encapsulating the corresponding cells. Sampling frequency in this embodiment can be 48 kHz. As shown in FIG. 10, chamber activation may be delayed by $\Delta t1$ to account for the time it takes for the cell to travel from the detection region to the encapsulation region. Moreover, $\Delta t2$ is the amount of time the chamber is activated. The length of $\Delta t2$ can be varied to control the size of the droplet generated.

Referring to FIG. 10, $\Delta t1$ is the delay between a detection of the presence of the cell and the activation of the droplet generation process and is a function of the velocity of the fluid and the distance between the electrodes and the droplet generation region. In one embodiment, additional delay due to signal processing time and chamber activation, which may be between 10 ms to 30 ms, may also be taken into account to produce the final value.

In one embodiment, in normal operational range, to generate droplets of 50 nm in diameter, the value is 50 ms. In one embodiment, activation pressure can be increased to lower $\Delta t2$ to improve the throughput of the system. In one embodiment, chamber actuation time may be varied from 10 ms to 500 ms and the frequency of generation may be around 10 Hz. Exemplary embodiments enable the scaling up of throughput through a parallelization of the platform.

Figure 11:
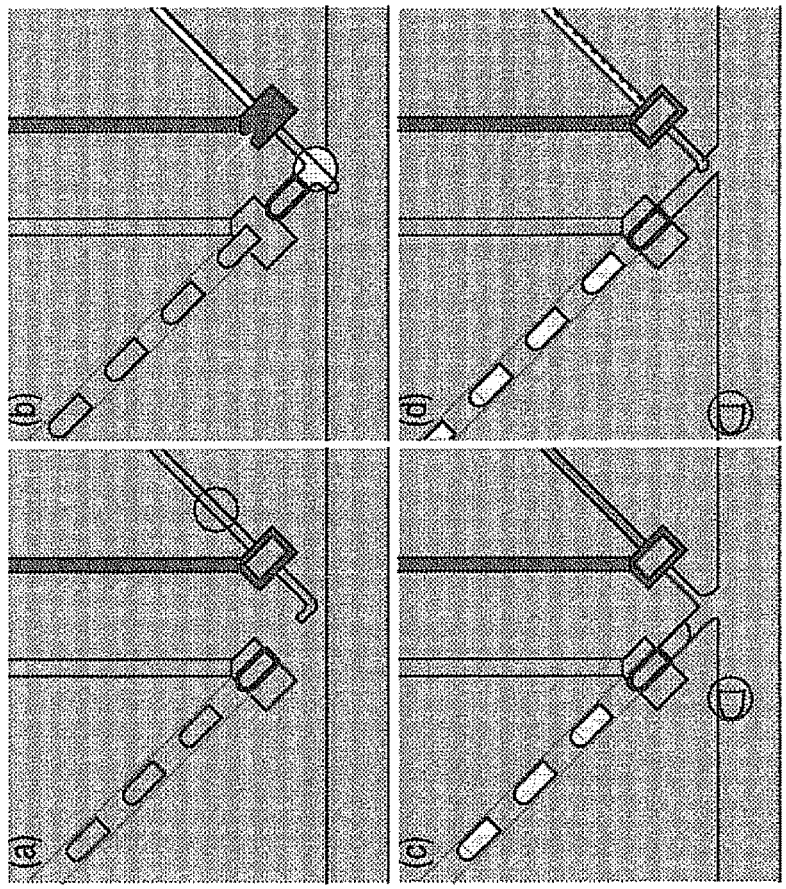
FIG. 11 is a diagram showing a sequence of a single cell being encapsulated by the droplet generation process of one embodiment of the present invention.

FIG. 11 is a diagram showing a sequence of a single cell being encapsulated by the droplet generation process of one embodiment of the present invention. More specifically, FIG. 11 shows sequential images of a single cell being encapsulated in a droplet. Circles highlight the cell inside the fluidic channel and inside the droplet. The arrow indicates the time point at which the membrane is deformed. The sequence shown: a) the cell in the channel just before the chamber—dispersed phase is directed towards the ground line; b) the cell right after the chamber was deformed to initiate droplet generation; c) membrane pressure is released and droplet was formed containing the cell; d) membrane returned to normal state the dispersed phase is directed to the ground line again. In one embodiment, this system not only enables the potential generation of 100% cell containing droplets, but serves as the basis of microfluidic platforms that are capable of performing small volume sampling out of a larger, continuously processed volume; thus providing an important stepping stone for droplet microfluidics to be integrated into large scale fluidic processes.

Figure 12:
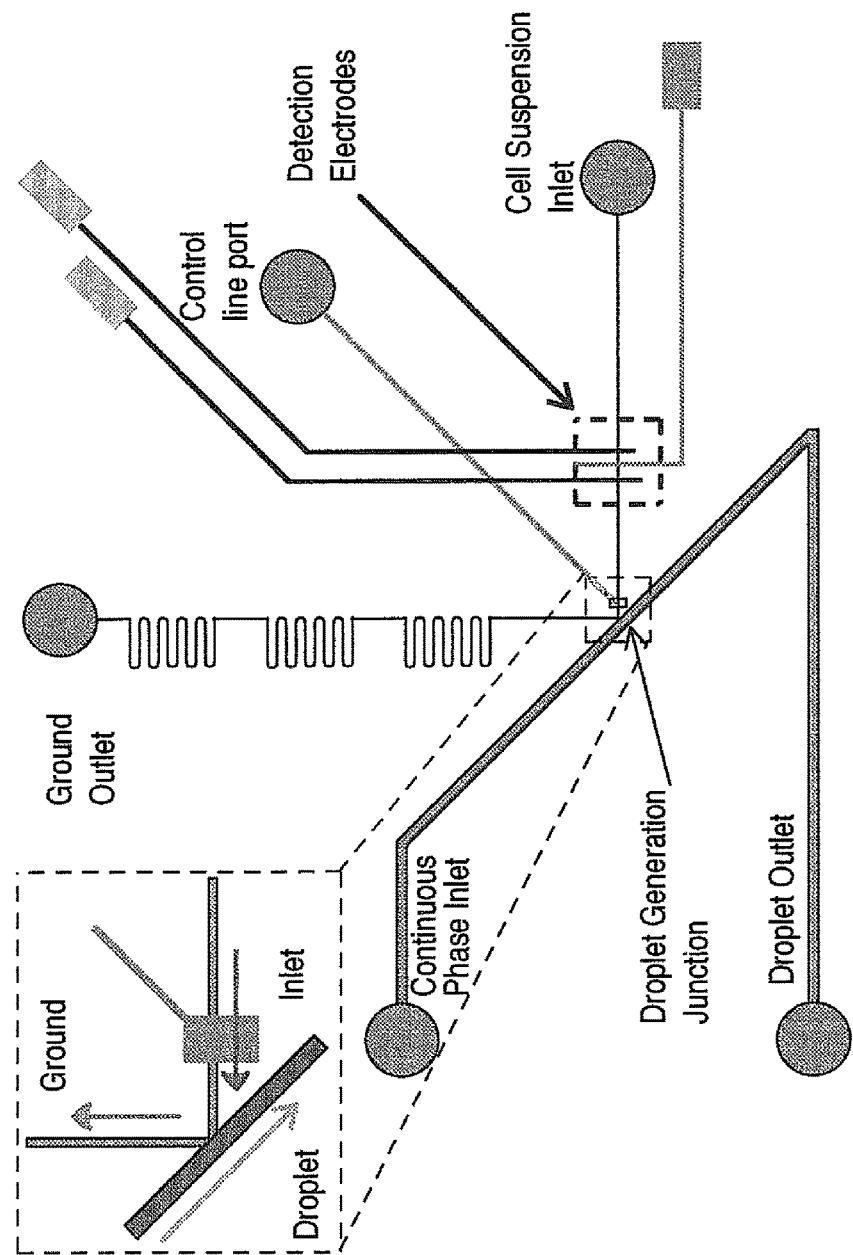
FIG. 12 is a diagram showing a view of a device of one embodiment of the present invention.
Figure 13:
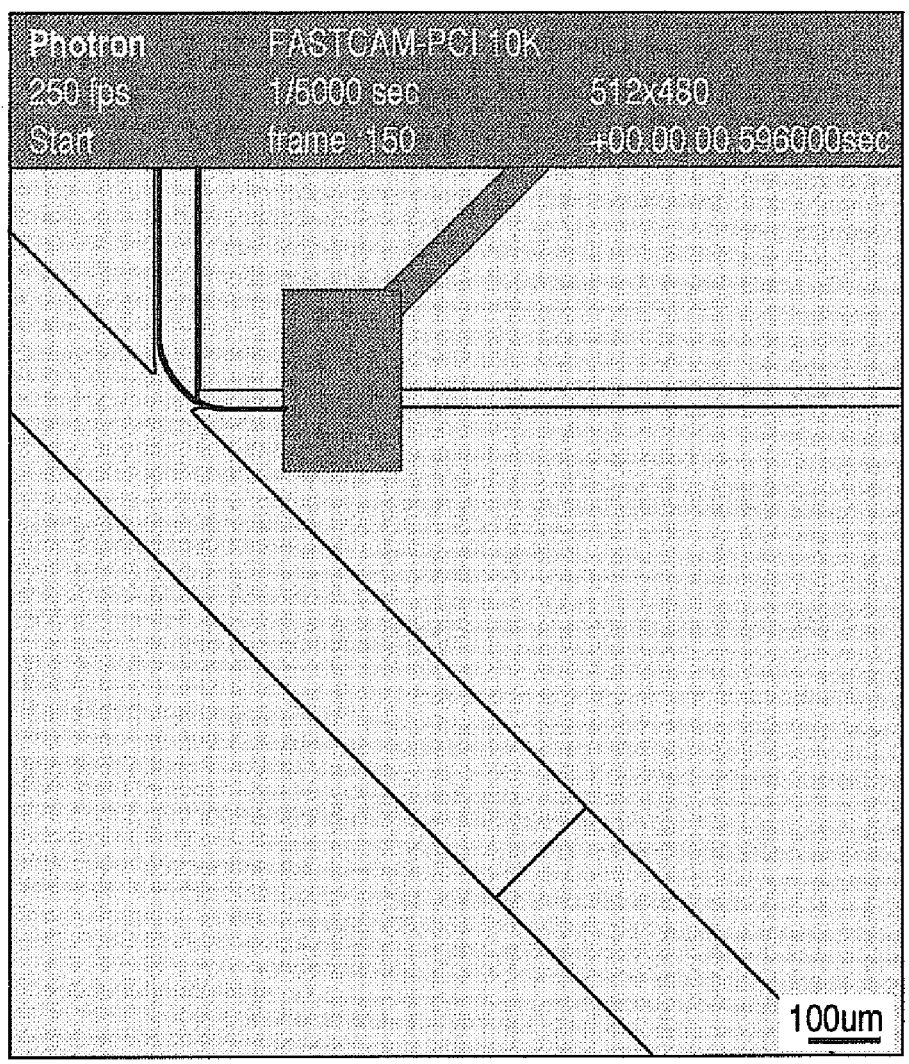
FIG. 13 is a diagram showing a portion of a device during droplet generation of one embodiment of the present invention.
Figure 14:
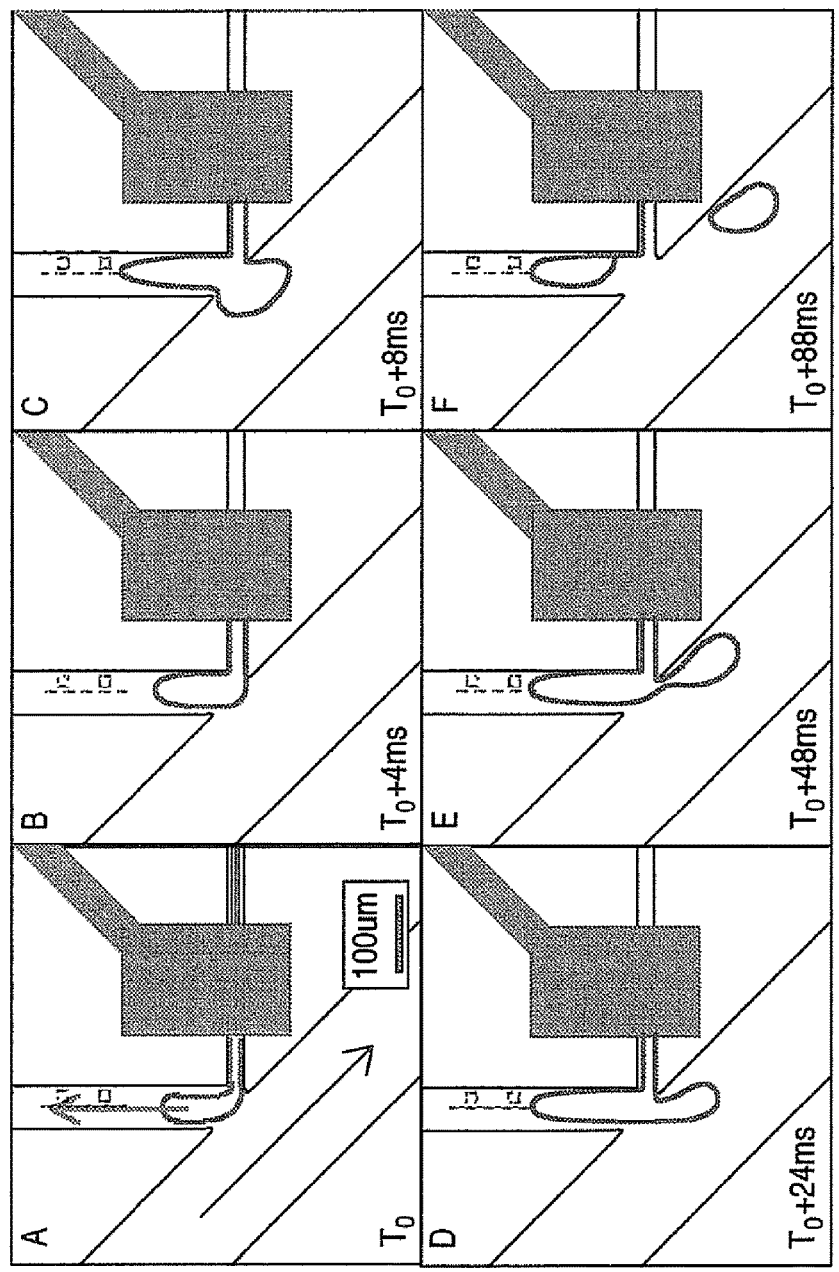
FIG. 14 is a diagram showing the droplet generation mechanism of a device during different stages of droplet generation of one embodiment of the present invention.
Figure 15:
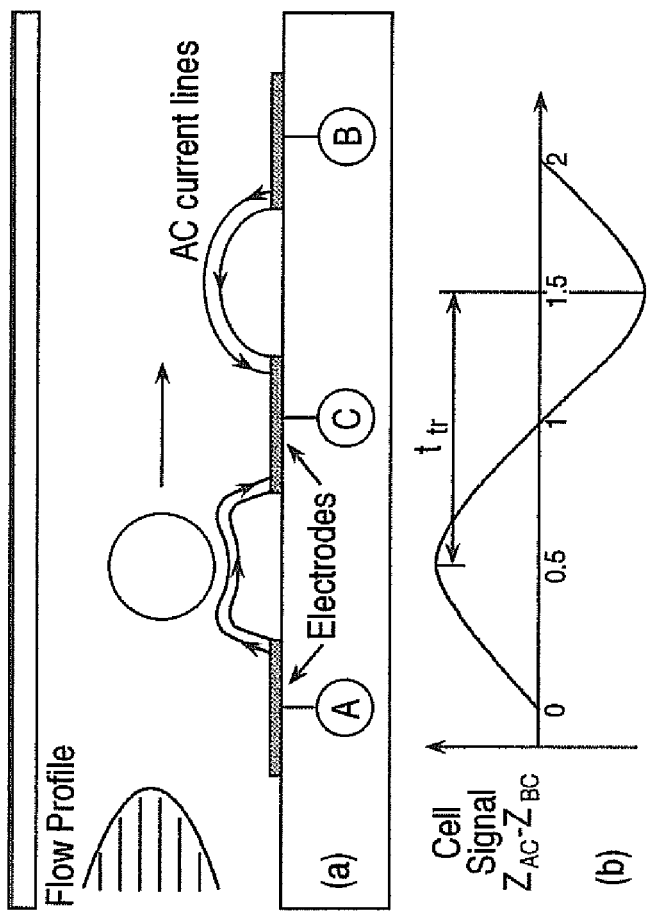
FIG. 15 is a diagram illustrating the impedance measurement of cells according to one embodiment of the present invention.
Figure 16:
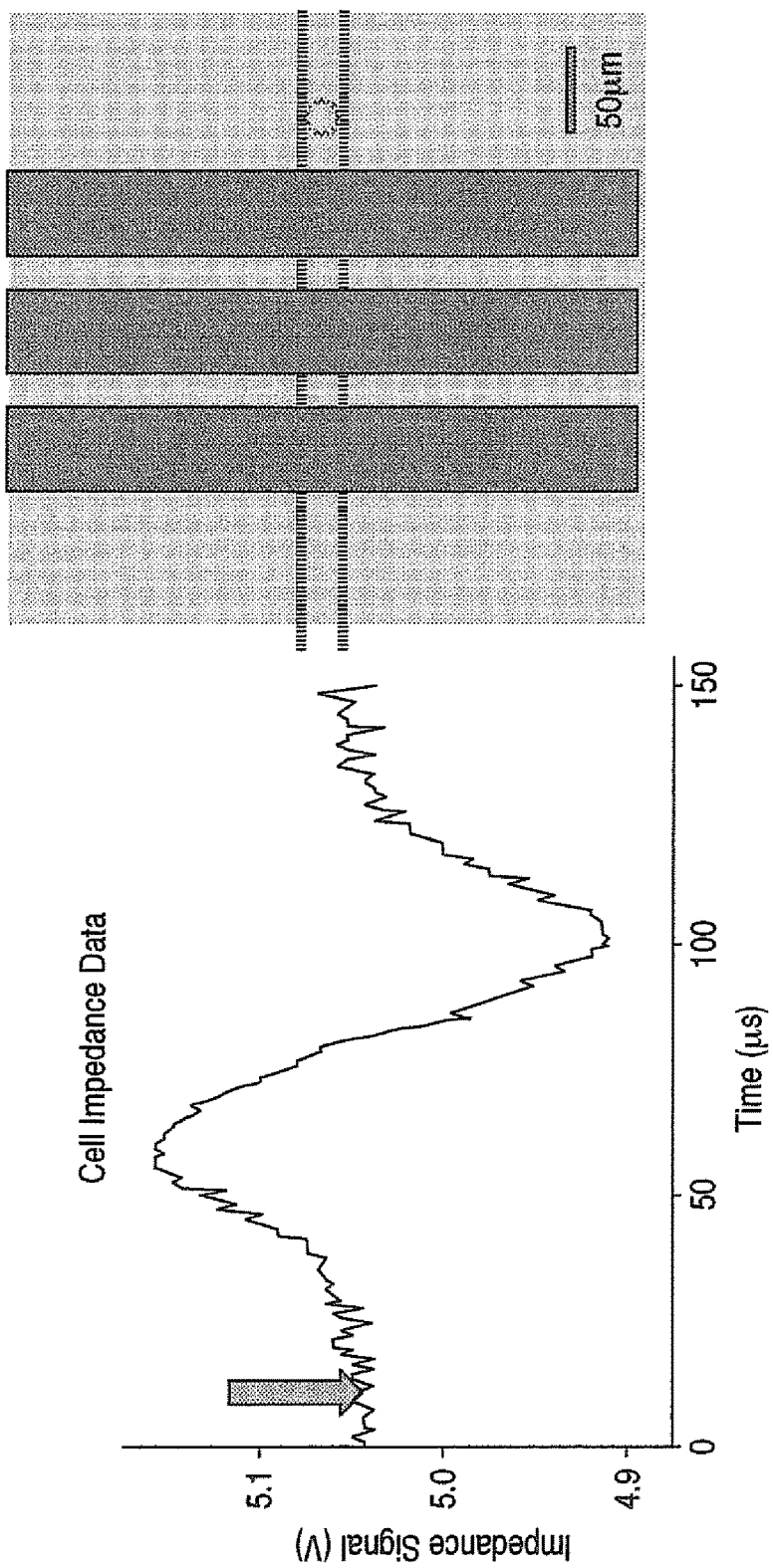
FIG. 16 is a graph illustrating cell impedance data that are associated with impedance measurement operations of one embodiment of the present invention.
Figure 17:
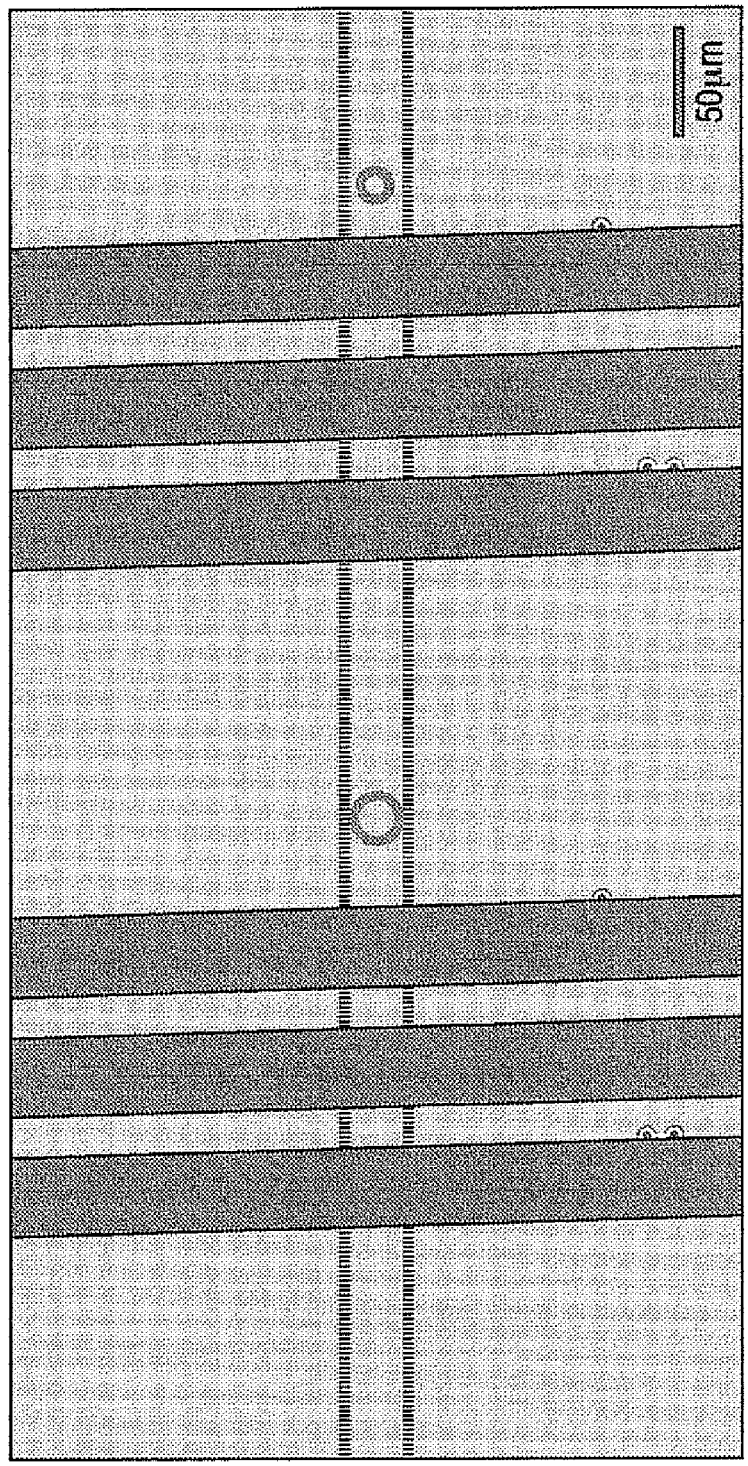
FIG. 17 is a diagram illustrating device components that are utilized as a part of impedance measurement operations of one embodiment of the present invention.

FIG. 12 is a diagram showing a view of a device of one embodiment of the present invention. A unique feature is the K junction. As illustrated in FIG. 12, the suspended cells inlet normally flows to the ground outlet unless the membrane deflects and generates a droplet that exits into the continuous phase channel. This configuration enables high efficiency encapsulation or selective encapsulation of cells or other particulates in the dispersed phase. FIG. 13 is a diagram showing a portion of a device during droplet generation of one embodiment of the present invention. FIG. 14 is a diagram showing the droplet generation mechanism of a device during different stages of droplet generation of one embodiment of the present invention. FIG. 15 is a diagram illustrating the impedance measurement of cells according to one embodiment of the present invention. In one embodiment, differential measures between 3 electrodes may be used, and information such as size and speed may be extracted. FIG. 16 is a graph illustrating cell impedance data that are associated with impedance measurement operations of one embodiment of the present invention. FIG. 17 is a diagram illustrating device components that are utilized as a part of impedance measurement operations of one embodiment of the present invention.

Figure 18:
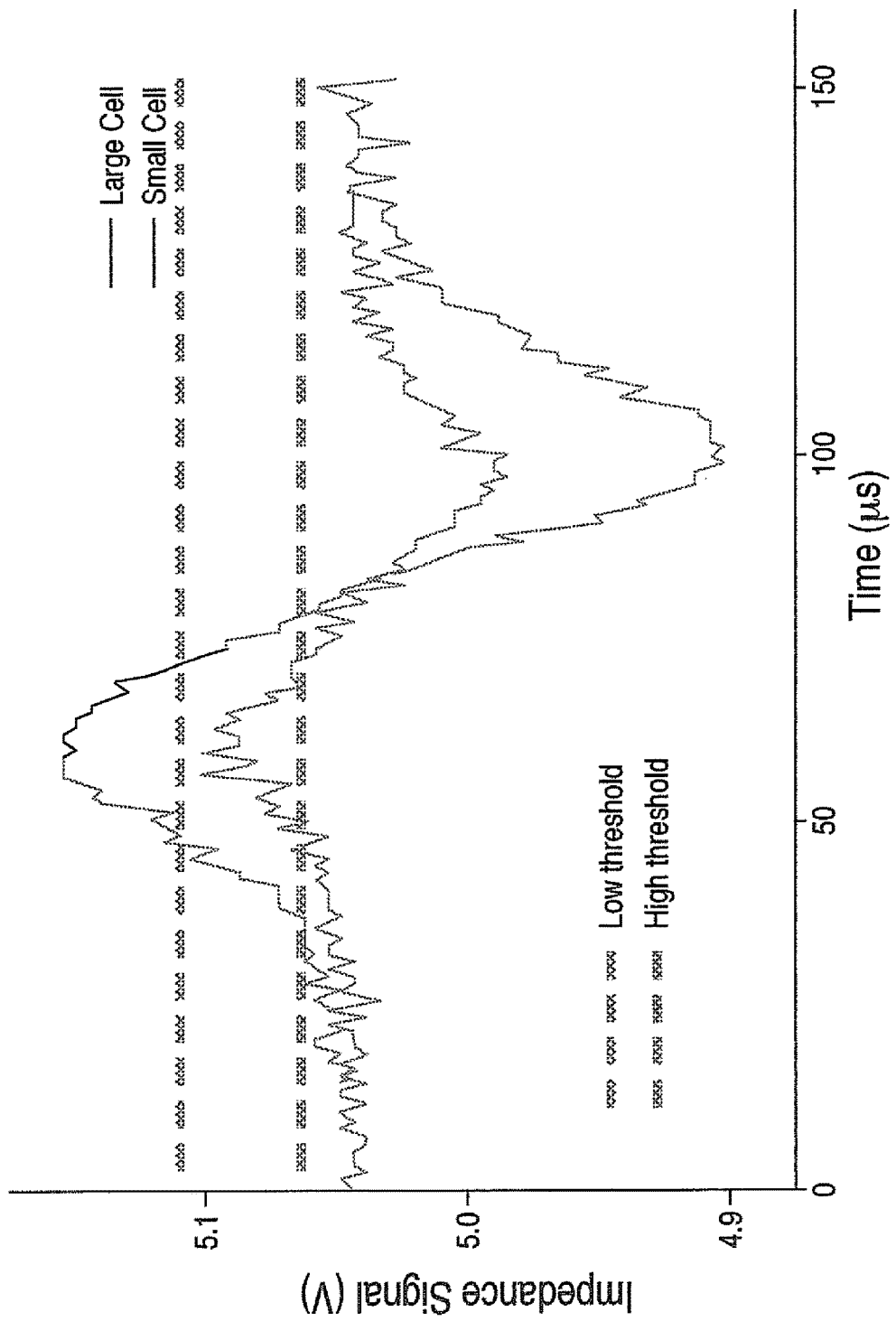
FIG. 18 is a graph of cell impedance data that is used in impedance signal processing operations of one embodiment of the present invention.
Figure 19:
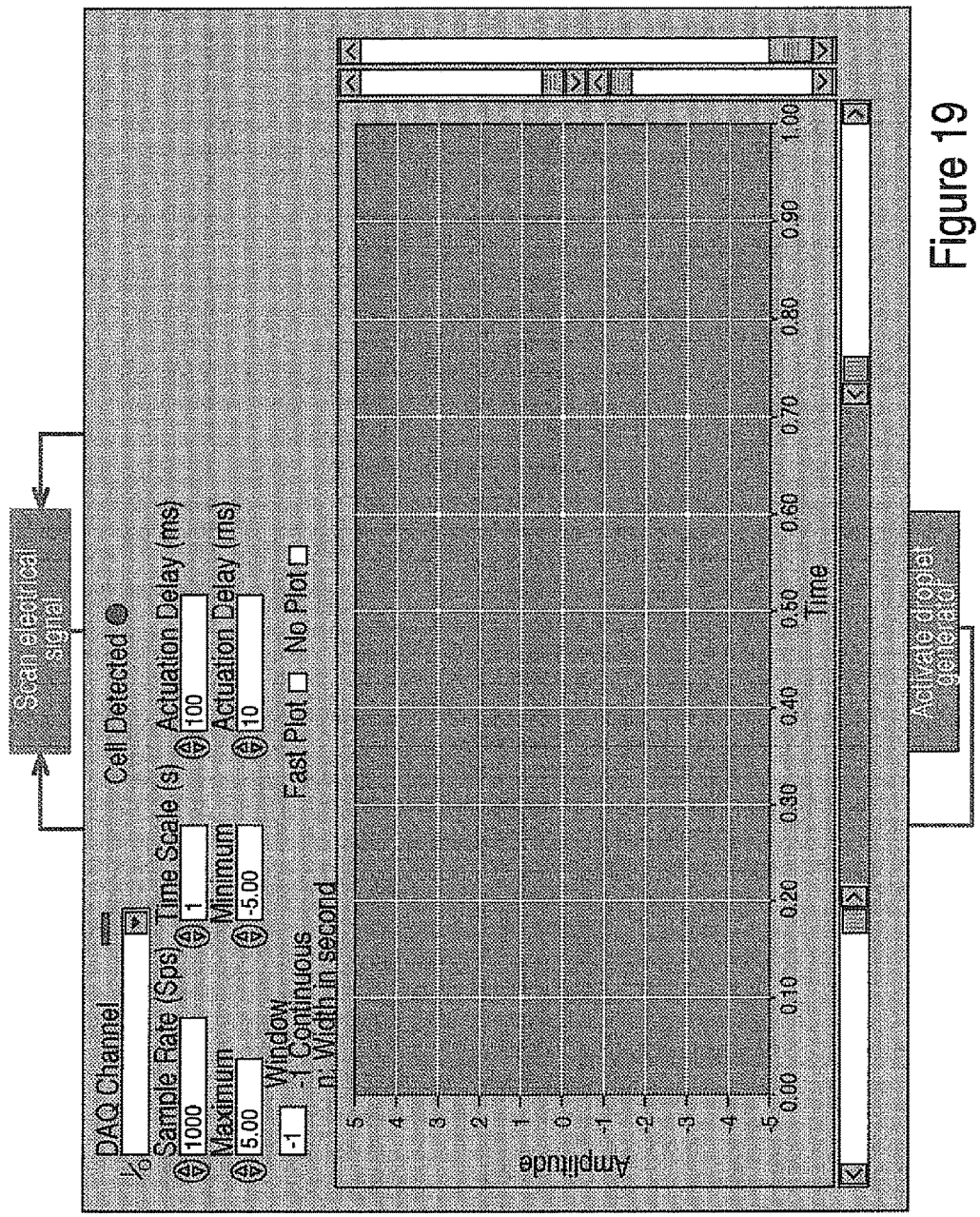
FIG. 19 is a diagram illustrating a LabVIEW interface for system integration of one embodiment of the present invention.
Figure 20:
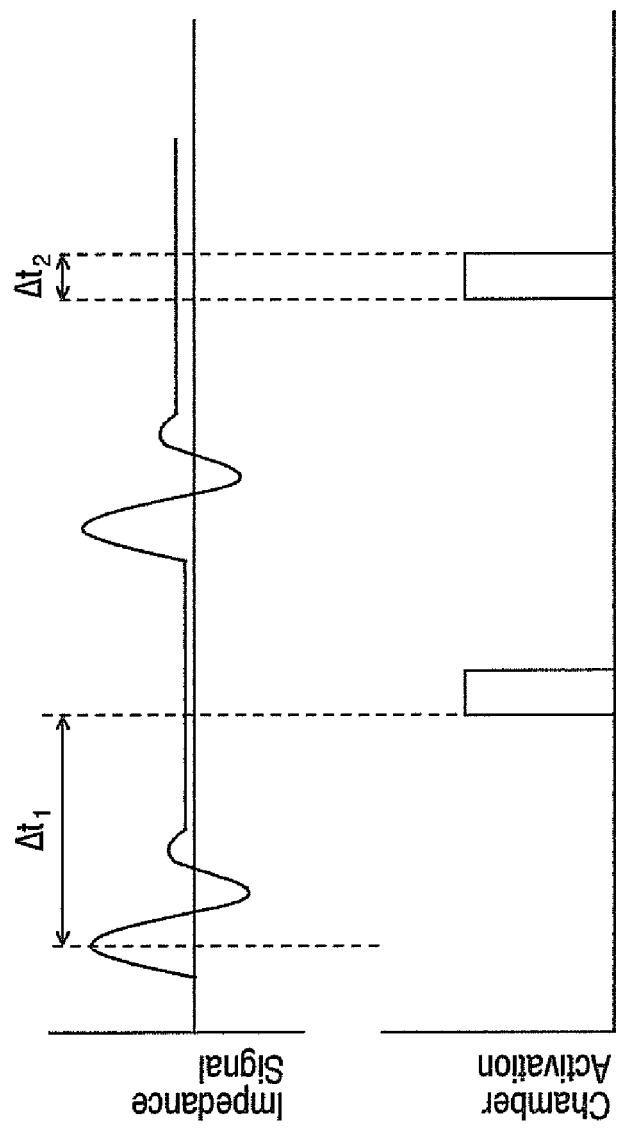
FIG. 20 is a graph that illustrates features of the encapsulation control scheme of one embodiment of the present invention.

FIG. 18 is a graph of cell impedance data that is used in impedance signal processing operations of one embodiment of the present invention. FIG. 19 is a diagram illustrating a LabVIEW interface for system integration of one embodiment of the present invention. FIG. 20 is a graph that illustrates features of the encapsulation control scheme of one embodiment of the present invention. FIGS. 21, 22 and 23 are diagrams showing problems of conventional systems that can be addressed by embodiments of the present invention. In one embodiment, the droplet generation rate may be about 10 droplets per second with 50 ms membrane actuation and 50 ms spacing. In one embodiment, LabVIEW based processing may provide 10 k samples per second. In one embodiment, a real time system embodiment may have much higher sampling rates. In one embodiment, based on the speed of the cells in the channel, densities of around $1 \times 10^6$ cells per mL can be accommodated.

Figure 24:
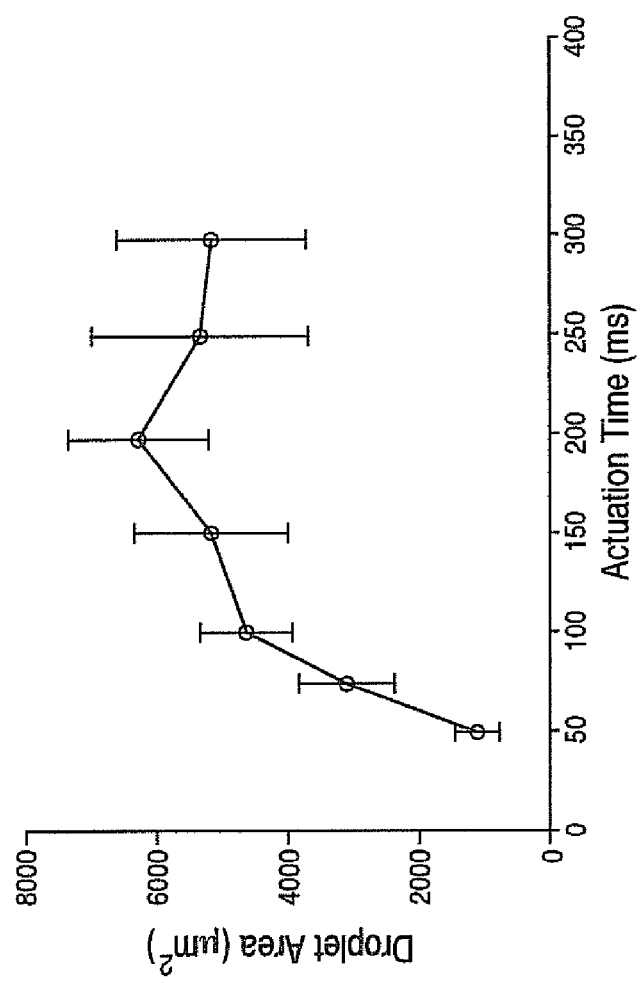
FIG. 24 is a graph of droplet size versus actuation time of one embodiment of the present invention.
Figure 25:
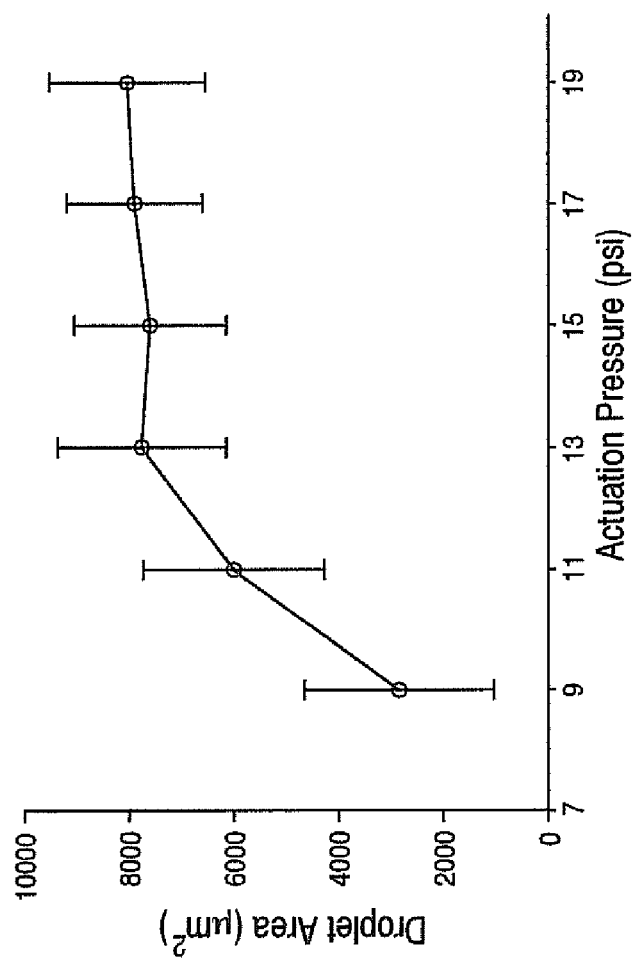
FIG. 25 is a graph of droplet size versus actuation pressure of one embodiment of the present invention.
Figure 26:
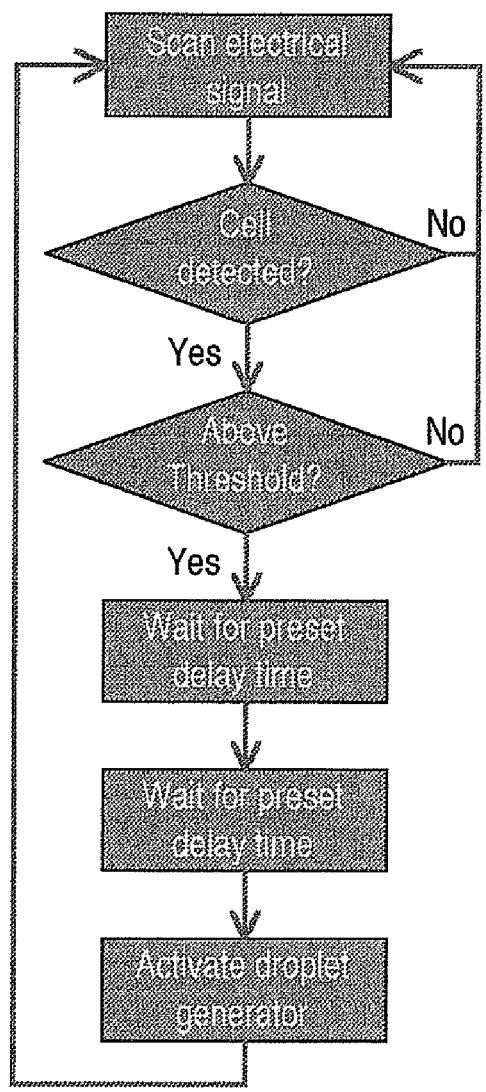
FIG. 26 is a flowchart of a process for actuating a droplet generator of one embodiment of the present invention.
Figure 27:
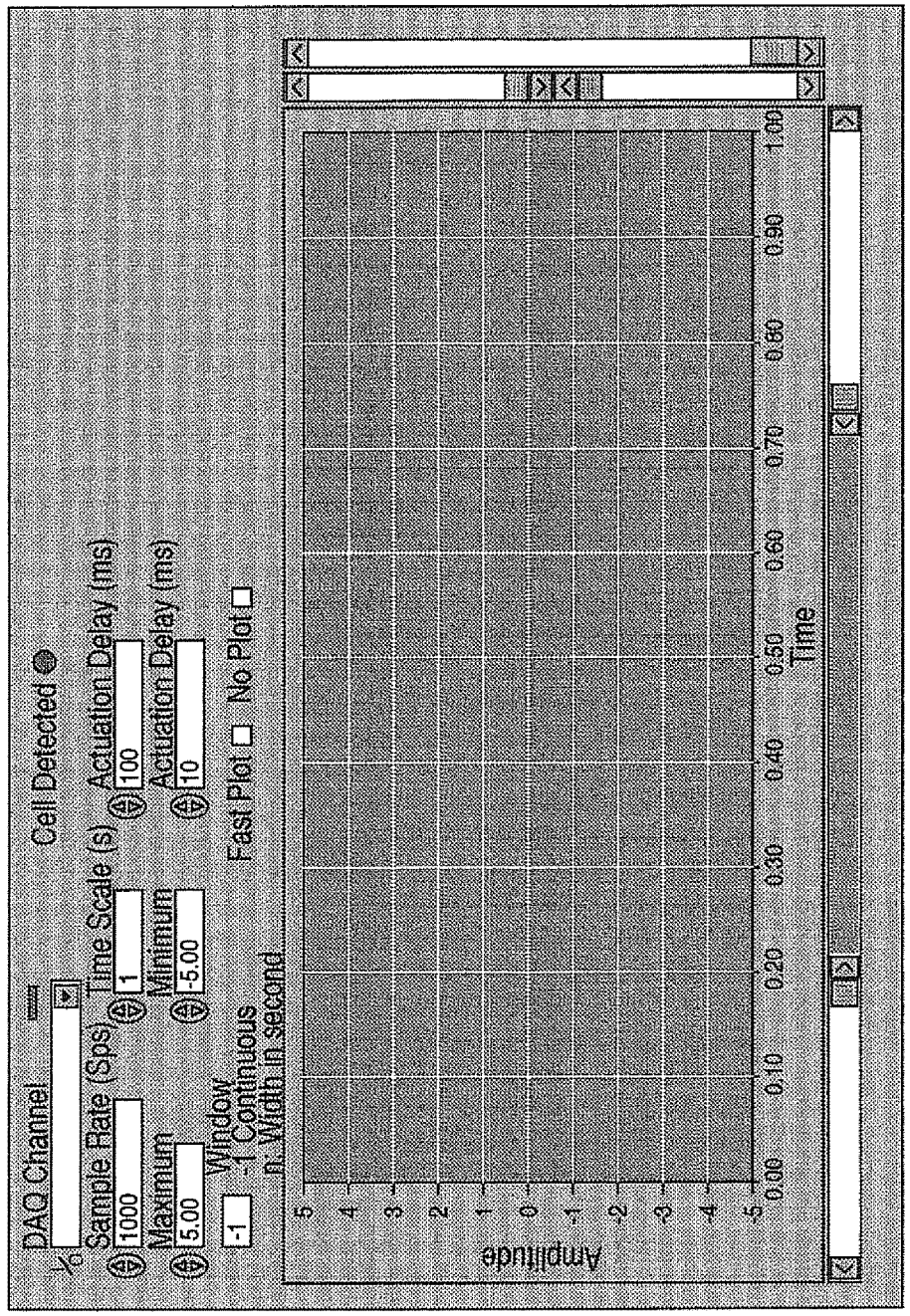
FIG. 27 is a diagram illustrating a screenshot of an interface of one embodiment of the present invention.

FIG. 24 is a graph of droplet size versus actuation time of one embodiment of the present invention. FIG. 25 is a graph of droplet size versus actuation pressure of one embodiment of the present invention. FIG. 26 is a flowchart of a process for actuating a droplet generator of one embodiment of the present invention. FIG. 27 is a diagram illustrating a screenshot of an interface of one embodiment of the present invention.

Exemplary embodiments provide a microfluidic cell encapsulation device integrated with an impedance-based detector that enables high efficiency production of cell-containing droplets. In one embodiment, this platform also can support a sampling process that allows the selective extraction of precise, digitized volumes out of a larger, continuous volume of fluid. Under another embodiment, a sub population of cells that have a unique impedance signature is selected. For example, the technique may selectively encapsulate white blood cells from whole blood or even circulating tumor cells from blood.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for generating cell-containing droplets from a dispersed phase fluid comprising:
   providing a dispersed phase fluid containing cells;
   directing all of the dispersed phase fluid through a first inlet channel to a ground outlet channel during a default state;
   measuring an electrical property, via an electrical sensor, of said dispersed phase fluid having a flow defining an upstream and a downstream direction;
   detecting a change in said electrical property, via said electrical sensor, said change being indicative of a presence of a cell in said dispersed phase fluid;
   transmitting an electrical signal indicative of said electrical property;
   selectively deforming a deformable chamber, disposed at an end of the first inlet, channel and downstream from the electrical sensor, in response to said detecting said change in said electrical property indicating the presence of said cell in said dispersed phase fluid;
   subsequently forcing an influx of said dispersed phase fluid containing said cell out of said deformable chamber into a droplet shearing junction in response to said selectively deforming; and
   subsequently generating a droplet containing said cell in response to said forcing;
   wherein said droplet containing said cell is directed into a continuous phase microfluidic channel instead of said ground outlet channel,
   wherein said first inlet channel is disposed diagonally from said continuous phase microfluidic channel, and said ground outlet channel is disposed diagonally from said continuous phase microfluidic channel and said first inlet channel such that said continuous phase microfluidic channel, first inlet channel, ground outlet channel, and droplet shearing junction form a K-configuration,
   wherein selectively deforming the deformable chamber in response to detecting said change in said electrical property indicating the presence of the cell in said dispersed phase ensures that only droplets containing cells are directed in said continuous phase microfluidic channel and that dispersed phase fluid lacking cells are prohibited from entering said continuous phase microfluidic channel.

2. The method of claim 1 wherein said electrical property is impedance.

3. The method of claim 1 further comprising: determining size of said cell in said dispersed phase fluid.

4. The method of claim 1 further comprising: calculating speed of said cell in said dispersed phase fluid.

5. The method of claim 1 further comprising: delaying said electrical signal indicative of said electrical property.

6. The method of claim 1 further comprising: delaying said electrical signal indicative of said electrical property for a delay between 10 ms and 30 ms.

7. The method of claim 1 further comprising: sampling said electrical property at a sampling rate of at least 48 kHz.

8. The method of claim 1 further comprising: actuating said deformable chamber containing said dispersed phase fluid.

9. The method of claim 1 further comprising: actuating said deformable chamber containing said dispersed phase fluid for a time between 10 ms and 500 ms.

10. The method of claim 1 further comprising: deforming said deformable chamber containing said dispersed phase fluid at a rate of at least 10 Hz.

\* \* \* \* \*